UNITED STATES PATENT OFFICE.

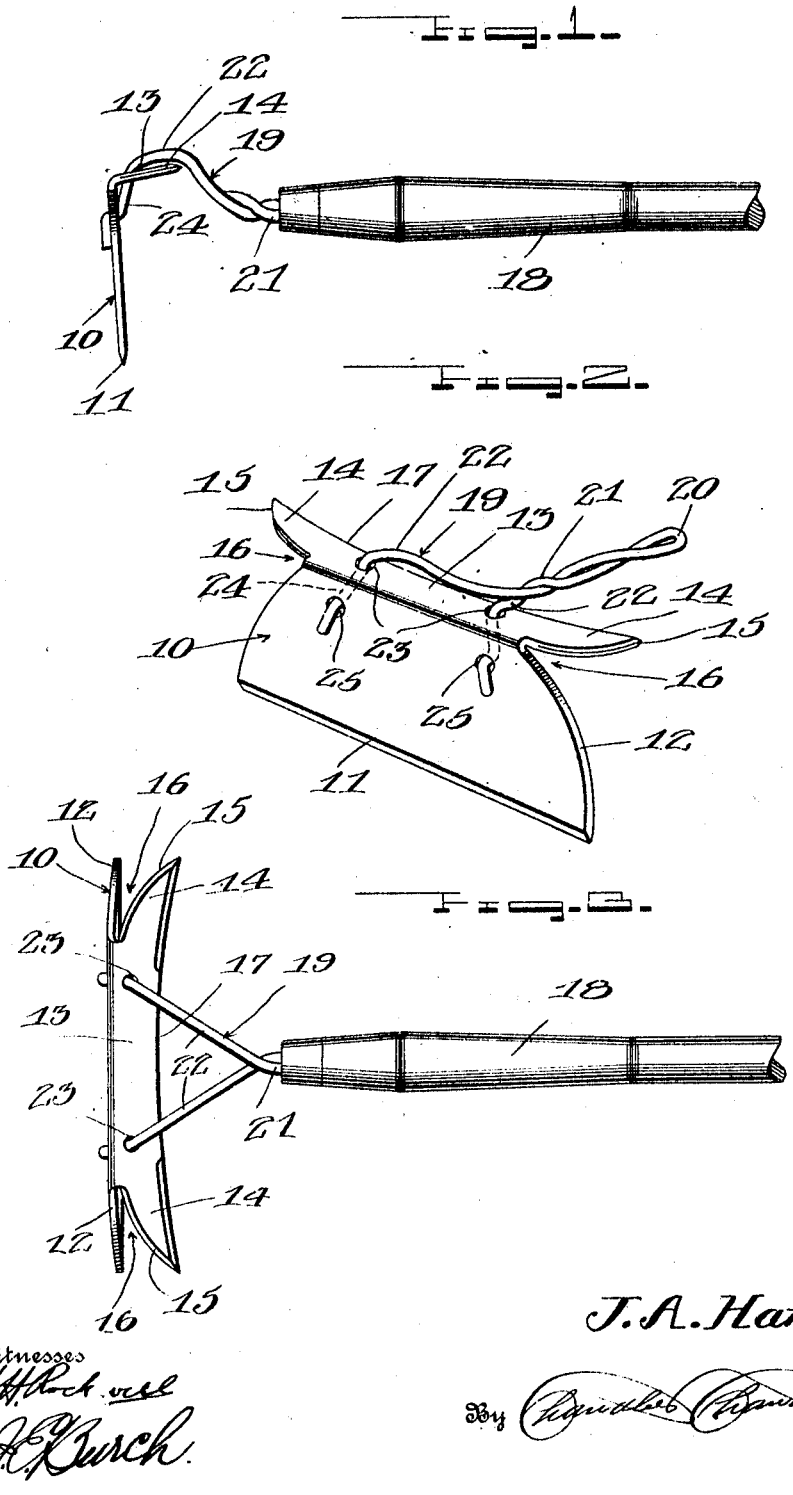

JAMES A. HANNEGAN, OF INDEPENDENCE, KANSAS.

HOE.

1,004,253.

Specification of Letters Patent. Patented Sept. 26, 1911.

Application filed June 13, 1911. Serial No. 632,839.

*To all whom it may concern:*

Be it known that I, JAMES A. HANNEGAN, a citizen of the United States, residing at Independence, in the county of Montgomery, State of Kansas, have invented certain new and useful Improvements in Hoes; and I do hereby declare the following to be a full, clear, and exact description of the invention, such as will enable others skilled in the art to which it appertains to make and use the same.

This invention relates to hoes and the principal object of the invention is to provide an improved hoe comprising a blade of novel form and novel means for attaching the same to a handle.

Another object of the invention is to provide a blade having its upper portion extended rearwardly at right angles and formed with incisions in opposite vertical edges thereof so as to provide cutting tongues adapted for use in removing weeds from growing plants, especially cotton whereby such operation may be carried on without materially decreasing the rate of operation and which will prevent the necessity of removing the weeds or other plants from around the cotton plants which it is desired to let stand, with the fingers.

Another object of the invention is to provide a double shank for attaching the blade to the handle, the shank being secured to the blade at two points in such a manner as to insure rigidity and strength.

With the above and other objects in view the invention consists of certain combinations and arrangements of parts as will be hereinafter more fully described and claimed it being a still further object to provide a device which will not be likely to get out of working order.

In the drawings:—Figure 1 is a side elevation of my improved hoe. Fig. 2 is an enlarged detail perspective view of the blade and attaching shank with the handle removed therefrom. Fig. 3 is a top plan view of the same.

Referring to the drawings by numerals, 10 designates the main blade of the hoe which is provided with a sharpened cutting edge 11 at its bottom edge and which has its sides curved upwardly and inwardly as shown at 12 so as to converge toward each other. The upper portion of the blade is bent at right angles to provide a supplementary attaching portion 13, the same having outwardly projecting tongues 14 and curved forward edges 15 formed by approximately V-shaped incisions 16 in the sides of a blank section of material from which the blade is formed.

The rear edge of the attaching portion 13 is concaved as shown at 17 so that the rear edges of the cutting tongues 14 will be slightly curved for positive action in severing the weeds or other plants which it is desired to remove from around the plant which is left standing and the curved edges formed by the V-shaped incision 16 serve to direct the tongues outwardly from the main blade of the hoe and thus prevent hindrance to the cutting operation by reason of the space formed between the edges 15 and 12. It is of course understood that the hoe is operated in the usual manner except for the purpose of removing the weeds and in this operation the blade is turned in position so that the cutting edge 11 is extended from the plants and the tongues 14 directed in a vertical position and upon either side of the plants at which it is desired to operate.

Proper movement of the blade forwardly or rearwardly when in this position after the tongues have been engaged with the weeds to be removed, will pull and cut the same from their growing position and leave but the single plant standing and without injury, it being understood that the tongues are projected into the earth in order to insure that no roots are left to permit continued growth of said weeds or superfluous plants.

In order to attach the handle 18 to the blade of the hoe, I provide a double shank comprising a single section of bar metal 19 bent upon itself as shown at 20 to form leg portions which are coiled around each other as shown at 21 to form a single stem embedded in the end of the handle and the leg portions converge outwardly as shown at 22 and extended upwardly where converged. These portions 22 are extended over the rear edge 17 of the supplemental attaching portion 13 and through openings 23 in it and the extremities of said portions are extended diagonally downwardly as shown at 24 and through openings 25 in the blade portion 10 and in contact with the forward face thereof. By this construction an absolutely rigid attaching means for the handle is provided, the double shank serving to exert strain upon the blade at two points thereby insuring equal stress upon all portions of the blade during the hoeing operation. The manner of extending the ends of the leg portions through the supplementary attaching member and the blade also strengthens the same where bent and the ends thereof which are in contact with the forward face of the blade serve to resist pressure upon its rear face when in use.

From the foregoing description in connection with the accompanying drawings, it will be seen that I have provided an improved form of hoe for the purpose intended and it will be obvious that the blade may be cut from a single blank section of properly tempered steel and the handle attached thereto very readily, the parts being of such simple character and construction that it may be economically manufactured.

I claim:—

1. A hoe comprising a blade having its upper portion bent at right angles rearwardly and formed with incisions in its side edges to provide oppositely extending cutting tongues, a shank having leg portions secured to the bent portion and blade respectively and a handle secured to the shank.

2. A hoe of the class described comprising a blade portion having a cutting edge with curved side portions and oppositely extended tongues at its upper edge, said tongues being formed at the ends of a supplementary attached portion disposed rearwardly at right angles to the blade and having curved forward edges and a handle having a shank portion extended through the rearwardly extended portion and blade respectively.

In testimony whereof, I affix my signature, in presence of two witnesses.

JAMES A. HANNEGAN.

Witnesses:
J. N. MASTERS,
S. H. HOSTLER.